United States Patent
Dalton et al.

(10) Patent No.: US 8,032,331 B2
(45) Date of Patent: Oct. 4, 2011

(54) DETECTION OF AIRFLOW ANOMALIES IN ELECTRONIC EQUIPMENT

(75) Inventors: Angela Beth Dalton, Austin, TX (US); Richard Edwin Harper, Chapel Hill, NC (US); William Joseph Piazza, Holly Springs, CA (US)

(73) Assignee: International Business Machines Corporation, Armonk, NY (US)

( * ) Notice: Subject to any disclaimer, the term of this patent is extended or adjusted under 35 U.S.C. 154(b) by 626 days.

(21) Appl. No.: 12/128,540

(22) Filed: May 28, 2008

(65) Prior Publication Data

US 2009/0138228 A1 May 28, 2009

Related U.S. Application Data

(63) Continuation of application No. 11/612,786, filed on Dec. 19, 2006, now Pat. No. 7,421,368.

(51) Int. Cl.
  *G06F 11/00* (2006.01)
(52) U.S. Cl. .................................. 702/186
(58) Field of Classification Search ........... 702/99, 702/116, 122, 123, 130, 132, 182, 185, 186; 236/49.3; 361/106; 700/295
  See application file for complete search history.

(56) References Cited

U.S. PATENT DOCUMENTS

| | | | |
|---|---|---|---|
| 5,528,908 A | 6/1996 | Bahel et al. | |
| 6,119,241 A | 9/2000 | Michail et al. | |
| 6,889,908 B2 * | 5/2005 | Crippen et al. | 236/49.3 |
| 2002/0101714 A1 | 8/2002 | Osecky et al. | |
| 2004/0035411 A1 | 2/2004 | Livchak | |
| 2005/0049729 A1 | 3/2005 | Culbert et al. | |
| 2005/0099163 A1 | 5/2005 | Liepold | |
| 2006/0100798 A1 | 5/2006 | Morman | |
| 2007/0032908 A1 | 2/2007 | Hyland et al. | |

* cited by examiner

*Primary Examiner* — Mohamed Charioui
(74) *Attorney, Agent, or Firm* — Cynthia G. Seal; Jeffrey L. Streets

(57) ABSTRACT

Thermal diagnostic systems and methods are provided for improved detection of airflow anomalies in a computer system. In particular, processor load is selectively increased to amplify the effects caused by any airflow anomaly that may be present in the computer system. Workload migration may be used to shift processor load from another node to a target node. Artificial load may also be generated on the target node. The processor load increased to a level sufficient that an airflow anomaly would cause a detectable temperature difference at the selected node. The processor load may be increased by an amount computed to generate this detectable temperature difference. Alternatively, the processor load may be increased by a predetermined amount of between 40% and 100% of full processor utilization. While at the increased processor load, actual temperature sensed by temperature sensors may be compared to temperatures predicted from the model to detect the presence or absence of an airflow anomaly.

6 Claims, 6 Drawing Sheets

DETECTION OF AIRFLOW ANOMALIES IN ELECTRONIC EQUIPMENT

CROSS-REFERENCE TO RELATED APPLICATIONS

This application is a continuation of and claims priority to co-pending U.S. patent application Ser. No. 11/612,786, filed on Dec. 19, 2006.

BACKGROUND OF THE INVENTION

1. Field of the Invention

The present invention relates to thermal diagnostics techniques applied to computer systems and other electronic systems. In particular, the present invention relates to the improved detection of airflow anomalies.

2. Description of the Related Art

Large computer systems are often consolidated into centralized data centers. Rack systems, in particular, conserve space and put the servers and infrastructure within easy reach of an administrator. "Blade" servers are among the more compact server arrangements. A blade server, such as the IBM eServer BLADECENTER (IBM and BLADECENTER are registered trademarks of International Business Machines Corporation, Armonk, N.Y.), is a type of rack-optimized server that eliminates many of the complications of previous generation rack servers. Due to the compact nature of rack systems, individual servers share a thermal environment with other hardware, such as enclosures, power supplies, fans, and management hardware. Managing power consumption and maintaining proper cooling is therefore critical. Because of the large number of elements typically housed within rack systems, the airflow and heating patterns are fairly complicated. Many potential causes of thermal problems exist, which can lead to component failure and increase the complication and expense of system maintenance.

Due to the complexity and sophistication of today's computer systems, computerized thermal diagnostic techniques have been developed to analyze the airflow and heating patterns in computer systems, to detect thermal faults and avert component failures. Flow Network Modeling is among the preferred thermal diagnostic techniques. U.S. Pat. No. 6,889,908, for example, describes a technique for diagnosing airflow anomalies in electronic equipment by introducing fault scenarios into a Flow Network Model of the equipment, and determining which simulated fault predicts a set of expected temperatures that match observed temperatures.

Airflow anomalies are one type of fault scenario that may be detectable by thermal diagnostics. An airflow anomaly is any airflow condition that may adversely affect cooling in a computer system. Airflow anomalies are usually unexpected or unintended airflow changes resulting from improper operation or maintenance, such as through accident, abuse, or neglect. Airflow anomalies may prevent proper cooling of a component, causing the component to heat up and possibly exceed safe operating temperatures, particularly when the computer system is subsequently operated at higher temperatures. At lower temperatures, however, little or no airflow may be required to cool components, so the temperature effects of an airflow anomaly may be minimal. Due to limitations such as the resolution of temperature sensors used in the diagnostic system and the computational uncertainty involved with thermally modeling a computer system, the minimal temperature effects of an airflow anomaly at low temperature may therefore be undetectable. As a result, airflow anomalies may lie dormant, undetectable by conventional thermal diagnostic techniques. Any undetected airflow anomaly may cause heating problems when the equipment is subsequently at higher temperatures, at which point it may be too late to take corrective action.

Improved thermal diagnostic techniques are needed in view of the limitations of existing techniques. More reliable detection of airflow anomalies is desired. An improved thermal diagnostic technique would preferably allow for the detection of airflow anomalies even when a computer system has been idling or otherwise operating at lower temperatures and loads.

SUMMARY OF THE INVENTION

According to one embodiment, a computer readable medium is encoded with a computer program code, for thermally modeling heating and airflow patterns in a computer system. Computer program code is provided for performing operations on one or more nodes of a computer system, for selectively increasing a processor load at a selected node to a level sufficient that an airflow anomaly would cause a detectable temperature difference at the selected node, for receiving a signal representative of an actual temperature at the selected node while at the increased processor load, for predicting a temperature at the selected node by thermally modeling the computer system at the increased processor load, and for computing a difference between the predicted temperature and the detected temperature to detect the presence of the airflow anomaly.

Other embodiments, aspects, and advantages of the invention will be apparent from the following description and the appended claims.

DETAILED DESCRIPTION OF PREFERRED EMBODIMENTS

The present invention provides systems and methods for increasing the reliability of thermal diagnostics by selectively increasing processor load. Increasing processor load increases the temperature of the processor, which amplifies the temperature effects of any airflow anomalies. The amplified temperature allows the thermal diagnostics system to more reliably distinguish between the presence or absence of an airflow anomaly and perhaps identify the location of the anomaly. Processor load may be selectively increased and thermal diagnostics may be performed during a period of reduced system activity, when the system would otherwise not be running hot enough for the reliable detection of airflow anomalies. Accordingly, airflow anomalies may be detected and corrected before subsequent periods of increased system activity, when it might be inconvenient or impossible to either perform diagnostics to detect an airflow anomaly or take corrective action to eliminate the airflow anomaly.

According to one embodiment, processor load is increased at one or more selected locations in a computer system to a level at which an airflow anomaly, if present, would result in a detectable temperature difference at the selected locations. The processor load may be increased via workload migration or by the imposition of an artificial load. Workload migration is the shifting of existing processes running on other nodes to a target node to increase the processor load on the target node. An "artificial load" is the generation of one or more processes for the purpose of increasing processor load on the target node, the computational results of which are generally not important.

An appropriate amount of an increase in the processor load may be determined in a variety of ways. An estimate may be computed of the minimum processor load necessary to generate a measurable temperature difference attributed to the presence of the airflow anomaly. An alternative approach is to increase the processor load to a predetermined level. The predetermined level may be expressed in terms of a percentage of a processor's maximum processing capacity. For example, the processor load at a selected location or node may automatically be increased by at least 40% of full capacity prior to performing thermal diagnostics. Alternatively, the processor load may be increased to about 100% (full capacity) to maximize the detectability of any airflow anomaly. Performing an infinite loop on the target node is one type of artificial load that may be imposed on the target node to increase processor load to full capacity. Furthermore, the additional load might alternatively include a CPU-intensive internal diagnostics workload (that has the additional benefit of testing the CPU's health), or a CPU-memory bus-intensive workload that consists of set of continuous reads and writes to memory (which exercises the CPU's bus driver circuitry and hence generates heat).

Figure 1:
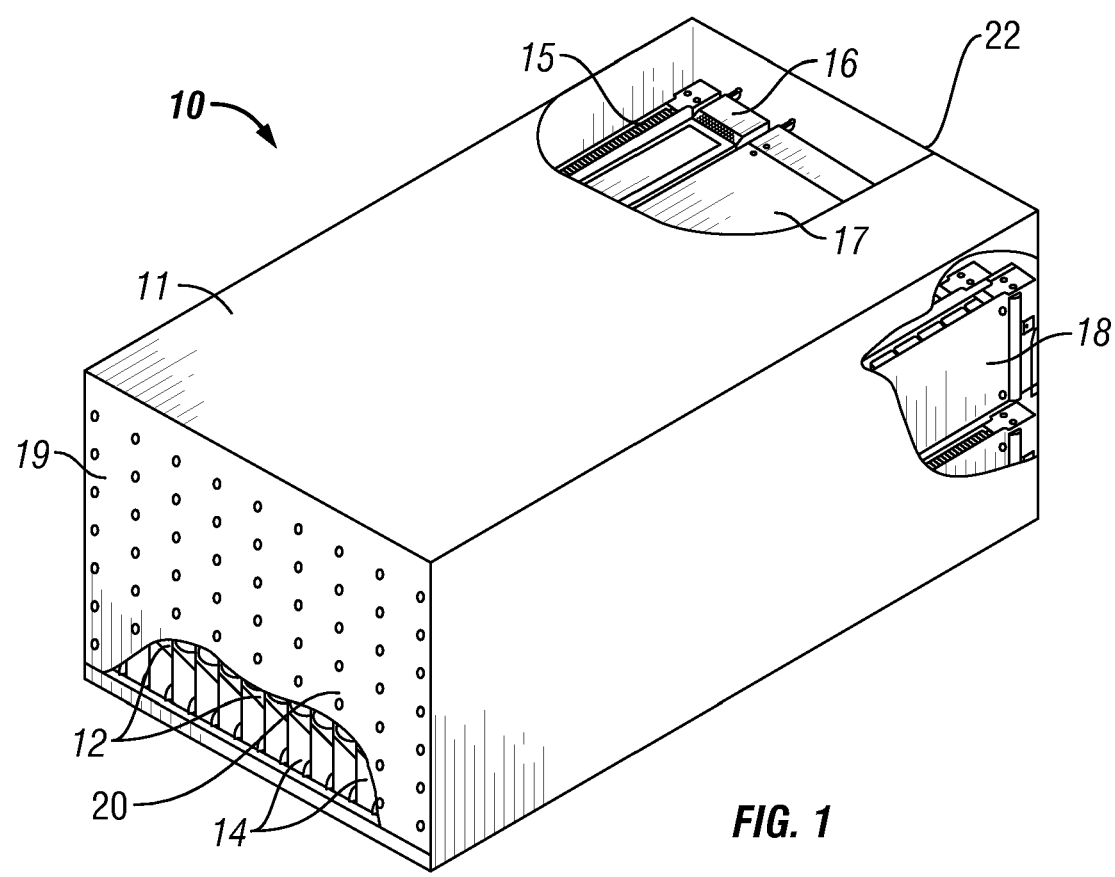
FIG. 1 is a perspective view of a representative rack server system ("computer system") on which thermal diagnostics may be performed according to the invention.

FIG. 1 is a perspective view of a representative rack server system ("computer system") 10 on which thermal diagnostics may be performed according to the invention. The computer system 10 includes an enclosure 11 with an optional grillwork 19. The enclosure 11 houses multiple servers 12. Each server 12 may include one or more processors. A processor is typically a "CPU," which is the component in a digital computer that interprets instructions and processes data contained in computer programs. The servers 12 may also include hard drives and memory to service one or more common or independent networks. Each server 12 is a node of the computer system 10. The servers 12 are shown as "blade" type servers, although the invention is also useful with other types of rack-mounted server systems, as well as other types of computer systems and electronic equipment. Numerous other electronic components are typically housed within the enclosure 11, such as a management controller module 15, a power module 16, at least one blower 17, and a switch module 18. The multiple servers 12 may share the management controller 15, power module 16, blower 17, switch module 18, and other support modules. Connectors couple the servers 12 with the support modules to reduce wiring requirements and facilitate installation and removal of the servers 12. For instance, each server 12 may couple with a gigabit Ethernet network via the switch module 18. The enclosure 11 may couple the servers 12 to the Ethernet network without connecting individual cables directly to each server.

The servers 12 and other components generate heat within the computer system 10. In particular, each server 12 generates heat corresponding to the amount of load placed on its processor(s) ("processor load"). Processor load generally relates to processor throughput, and may include such factors as processor speed, clock speed, bus speed, the number of individual processors recruited for performing a task, and so forth. Processor load may be measured according to metrics such as MIPS ("million instructions per second") or teraflops. The amount of processor load may also be characterized in terms of a processor's processing capacity, such as "percentage of full processor utilization." The percent utilization of an individual processor is typically the percentage of that processor's maximum processing capacity. The percent utilization of a group of processors may be expressed in terms of the combined processing capacity of the multiple processors. For example, at an instant in time, a hypothetical three-processor server may have a first processor operating at 33%, a second processor operating at 50%, and a third processor operating at 67%. The percentage of full processor utilization in a particular multi-processor node may be defined as the arithmetic average of the processor load on all three processors, which in this example is 50%. The load on processors is typically dynamic, so the percent utilization, itself, may be expressed instantaneously or as an average utilization over time. The greater the processor load, the greater the heat generated. For example, a server operating at full processor utilization (100%) will almost always run hotter than a server operating at 50% utilization.

The blower 17 generates forced air convection through the chassis 11 to remove heat from the computer system 10. Intake vents 14 are positioned below the servers 12 to allow the entry of air used to cool the computer system 10. The blower 17 draws air into the front 20 of the enclosure 11, through intake vents, routing air through the servers 12 and other heat-generating components, and exhausting the heated air through the rear 22 of the enclosure 11, where the heated air mixes with ambient air. Air typically follows numerous flow paths through the computer system 10, with a net airflow rate ($Q_{net}$) in the computer system 10 being from the front 20 to the rear 22 of the enclosure 11. The net airflow through the enclosure 11 may be controlled to sufficiently cool the components of the computer system 10. For example, the net airflow rate may be controlled by controlling the speed of each blower 17, by controlling the number of blowers 17 recruited, or both. During periods of reduced processor load, the net airflow rate may be reduced by reducing the blower speed of one or more blowers or by turning off one or more of the blowers 17. At lower processor loads, it is possible that forced air flow may not be required at all, and all of the blowers 17 may be turned off without adverse heating consequences.

Processor load may also be adjusted to control temperatures within the computer system 10. Conventionally, the reasons for adjusting processor load have included the desire to reduce temperatures and/or noise levels in a computer system. For example, processor load and corresponding heat and power consumption may be reduced by "throttling" the processor(s), placing subsystems into power-saving modes of operation, or powering off unused circuitry. Other examples of reducing processor load are reducing a clock frequency or operating voltage of one or more of the CPUs, or introducing wait or hold states into the activity of the CPUs. In contrast, the invention includes methods of selectively increasing processor load to increase temperatures, for facilitating thermal diagnostics.

Figure 2:
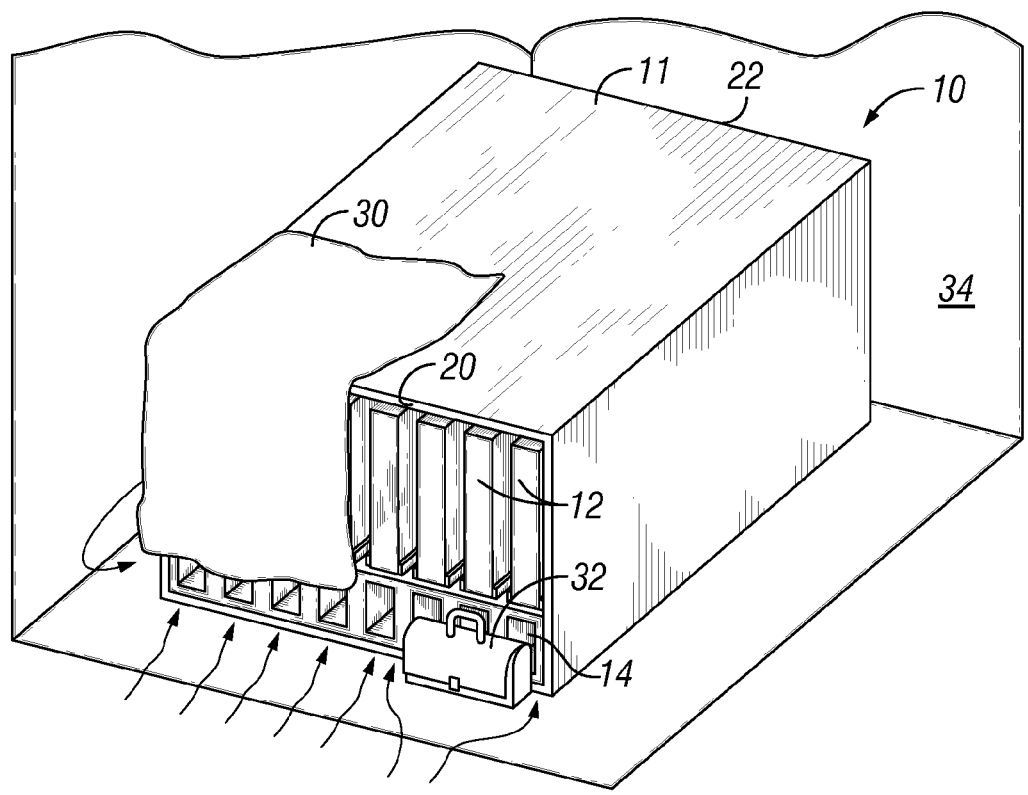
FIG. 2 is a perspective view of the computer system illustrating some potential causes of airflow anomalies.

FIG. 2 is a perspective view of the computer system 10 illustrating some potential causes of airflow anomalies. An airflow anomaly is any airflow condition that may adversely affect cooling at one or more location within the computer system 10, which may cause components to overheat. An airflow anomaly is typically a consequence of the failure to follow proper operation and maintenance of a computer system. Thus, an airflow anomaly may result from accident, neglect, abuse, lack of training by personnel working in the vicinity of a computer system, or operation or tampering with a computer system by unauthorized personnel. The draping of a tarp 30 over a portion of the front 20 of the enclosure 11 is one occurrence that would be likely to cause an airflow anomaly in the computer system 10. The tarp 30 may have been placed on the enclosure 11 by outside contractors who are not trained in the operation of sophisticated computer equipment and are unaware of the adverse consequences that may arise from blocking airflow through the computer system 10. The tarp 30 obstructs several of the intake vents 14 on the left side of the enclosure 11, as well as any ventilation ports that may be included with the servers 12 on the left side of the enclosure 11. Another potential cause of an airflow anomaly is the placement of a briefcase 32 against the front 20 of the enclosure 11, which blocks several of the intake vents 14 on the lower right side of the enclosure 11. The positioning of the enclosure 11 with the rear 22 of the enclosure 11 in close proximity to a wall 34 is another potential cause of an airflow anomaly. The wall 34 partially obstructs or restricts airflow exiting the enclosure at the rear 22. The airflow obstructions caused by the tarp 30, the briefcase 32, and the close positioning of the enclosure 11 to the wall 34, either alone or in combination, may cause adverse heating effects within the computer system 10.

Figure 3:
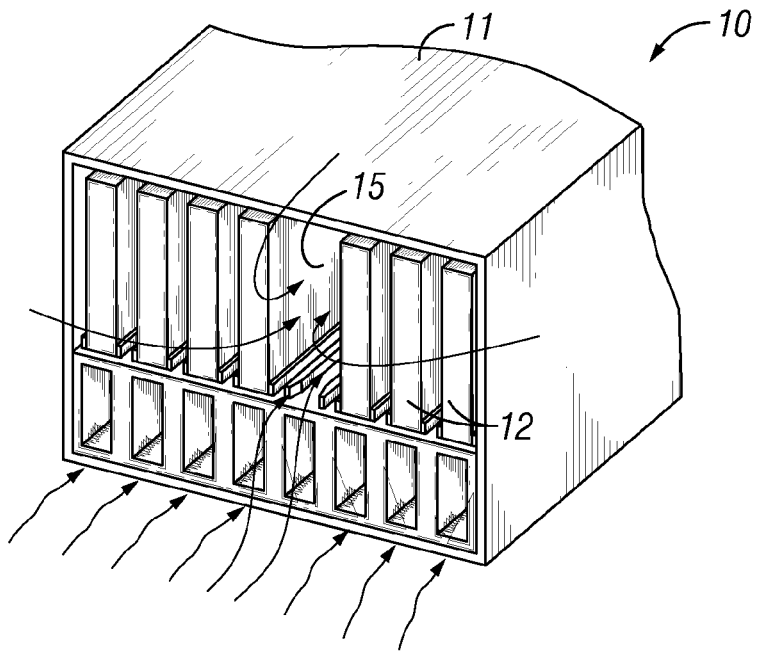
FIG. 3 is a perspective view of the computer system illustrating a potential cause of another type of airflow anomaly.

FIG. 3 is a perspective view of the computer system 10 illustrating another type of airflow anomaly. One of the servers 12 is removed from its slot 15 in the enclosure 11. Ordinarily, a filler panel (not shown) should be used to cover an empty slot where a server has been removed, so that airflow through the computer system 10 is substantially unaffected. If the filler panel is left off then an airflow anomaly may occur. In contrast to the various airflow obstructions illustrated in FIG. 2, the absence of a filler panel or server 12 in slot 15 may actually increase airflow local to the slot 15. However, increased airflow to the slot 15 may lead to a commensurate airflow reduction to neighboring servers 12 or other components. This change in airflow may cause the neighboring servers 12 or other components to become "cooling air-starved," causing undesirable hotspots or other adverse heating effects at locations within the computer system 10. The potential causes of airflow anomalies are unlimited, and the scenarios illustrated in FIGS. 2 and 3 are merely examples.

Figure 4:
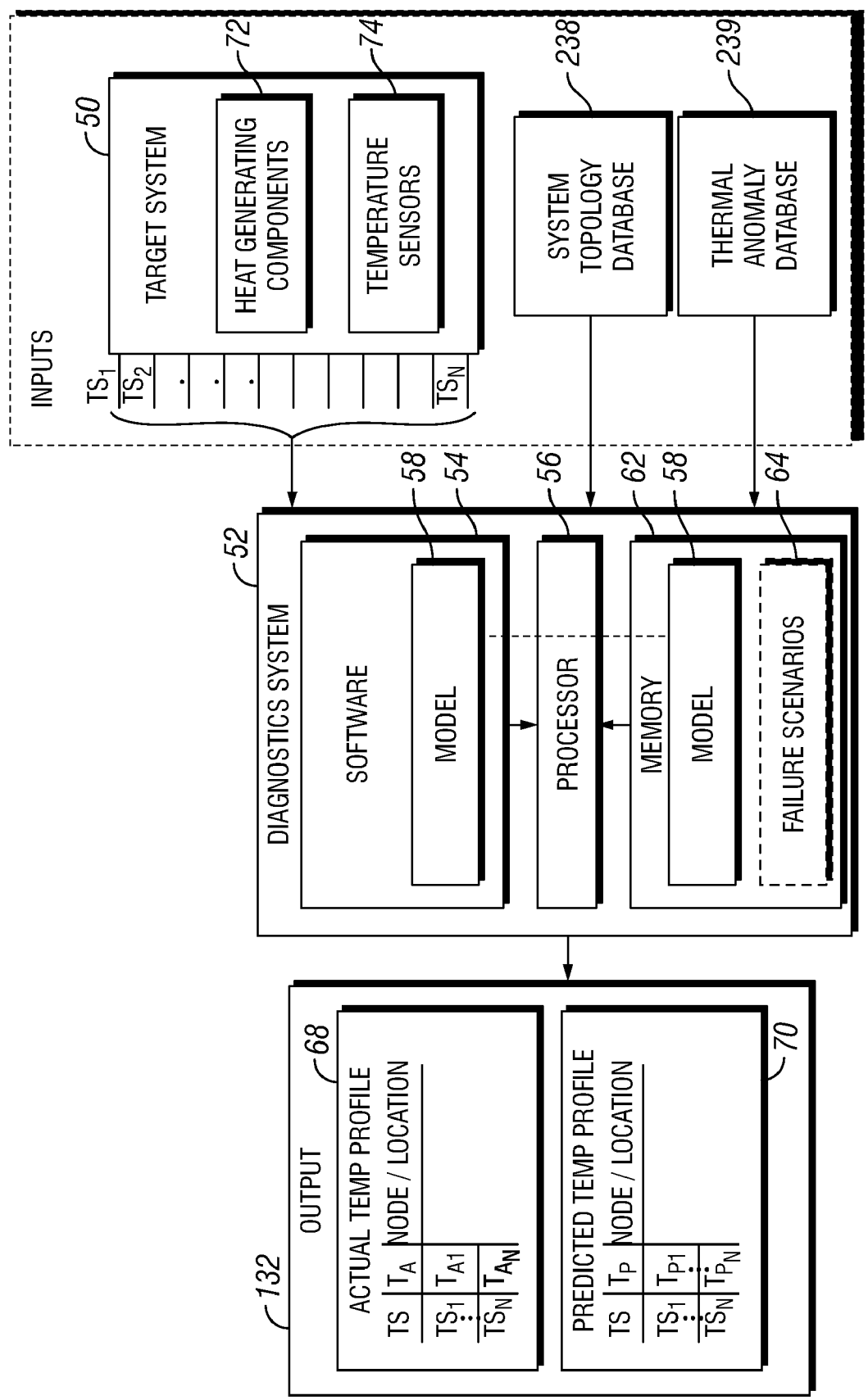
FIG. 4 is a schematic diagram of one embodiment of a diagnostic system for performing thermal diagnostics on a computer system.

FIG. 4 is a schematic diagram of one embodiment of a diagnostics system 52 for performing thermal diagnostics on a computer system (the "target system") 50. The diagnostic system 52 may be used to detect faults in the computer system 10, including airflow anomalies such as those illustrated in FIGS. 2-3. The target system 50 may be, for example, the computer system 10 of FIGS. 1-3. The diagnostics system 52 is a computer used for performing thermal diagnosis on the target system 50. The diagnostics system 52 may be or include a server or subsystem of the target system 50. Alternatively, the diagnostics system 52 may be or include a separate computer. The target system 50 houses heat-generating components 72, such as servers, which are cooled by the flow of air through an enclosure. Temperature sensors 74 sense temperatures of the heat-generating components 72 and generate signals representative of the temperatures. The diagnostics system 52 includes software 54, at least one processor 56, and memory 62. The diagnostics system generates output 132, such as temperature profiles and fault signals. The thermal diagnostics software 54 may include thermal analysis software and firmware for generating a model 58 of heat and airflow in the target system 50. The model 58 may be based on Flow Network Modeling or other known thermal diagnostics techniques. The heat transfer model 58 takes into account system topology 238, which may include and interrelate heat transfer parameters, airflow parameters, and other parameters of the heat-generating components 72. Data used to generate the heat transfer model 58 may be input via a user peripheral, such as a keyboard, a pointing device, or an LCD display.

The diagnostics system 52 receives and processes temperature signals from the temperature sensors 74 to compute an "actual temperature profile" 68, which is included with the output 132. The actual temperature profile 68 is a data set that includes actual temperature (Ta) and location/node information that may be detected by a temperature sensor (TS) at or within each node. The actual temperature profile 68 may optionally be expressed visually as a chart, graph, listing of the data, or other visual representation. The actual temperature profile 68 may also be stored in the memory 62 for further processing by the diagnostics system 52. The diagnostics system 52 also processes the model 58 to output a corresponding "predicted temperature profile" 70. The predicted temperature profile 70 is a data set that includes predicted temperature (Tp) and location/node information corresponding to the temperature sensors 74. Thus, the predicted temperature profile 70 is a prediction of temperatures mapped to the servers or other nodes of the target system 50. The actual temperature profile(s) 68 may be compared with the predicted temperature profile(s) 70 to detect faults such as airflow anomalies. Because the detection of airflow anomalies typically involves a comparison of actual temperature to predicted temperatures, the difference between actual temperatures sensed by temperature sensors and expected temperatures predicted by the model are an important factor in the detection of an airflow anomaly.

The comparison of actual and predicted temperatures may be performed in a variety of ways. For example, according to one approach, the target system 50 is modeled with the assumption that an airflow anomaly is not present. This assumption forms the basis of a hypothesis that is tested by comparing the actual temperature profile 68 with the predicted temperature profile 70. If the difference between the actual and predicted temperatures is small, then the hypothesis that no airflow anomaly is present is probably correct. A large difference, however, indicates that a potential airflow anomaly may exist. Thus, the diagnostics system 52 may be configured to generate a signal, such as an alarm signal, indicative of an airflow anomaly if the temperature difference exceeds a predetermined setpoint. According to another approach, the target system 50 may be modeled with the assumption that an airflow anomaly is present. This assumption forms the basis of another hypothesis that is also tested by comparing the actual temperature profile 68 with the predicted temperature profile 70. In this case, however, if the deviation between the actual and predicted temperatures is small, then an airflow anomaly probably is present. Therefore, the computer 52 may generate a signal indicative of an airflow anomaly if the deviation is less than a predetermined setpoint. According to yet another approach, the diagnostic system 50 may model multiple hypothetical airflow anomalies and compare the actual temperature profile 68 to the predicted temperature profile 70 for each hypothetical airflow anomaly. The diagnostic system 50 may then select the hypothetical airflow anomaly for which the predicted temperature profile 70 most closely matches the actual temperature profile 68. These approaches are merely examples. Each of these approaches to detecting thermal anomalies involves making a comparison between actual and predicted temperatures.

Figure 5:
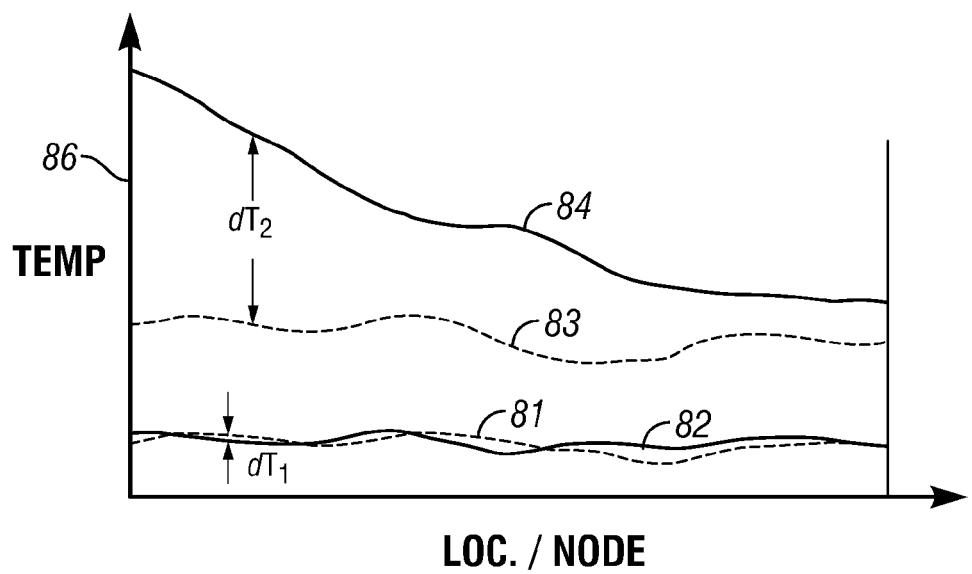
FIG. 5 is a graph of four temperature profiles of a hypothetical computer system under different loading conditions.

The adverse heating effects caused by an airflow anomaly, such as those anomalies illustrated in FIGS. 2 and 3, will be more pronounced under conditions of increased processor load. This is because a component runs hotter at higher loads, and the presence of the airflow anomaly may prevent proper cooling of the component at higher temperatures. However, any effects caused by an airflow anomaly while a server is temporarily at lower processor load may be negligible. This is because the server may be running cool enough to either not require airflow or at least not be appreciably affected by changes in airflow. Therefore, the invention provides methods of increasing processor load to amplify any effects caused by an airflow anomaly, to more reliably detect airflow anomalies. FIG. 5 further illustrates this principle.

FIG. 5 is a plot of four temperature profiles 81-84 of a hypothetical computer system under different loading conditions. In this example, the hypothetical computer system is a rack server system having an array of servers. The four temperature profiles 81-84 represent a temperature distribution taken along a plane parallel to the front of an enclosure, bisecting the row of servers. The left and right boundaries 86 and 88 coincide with respective left and right sides of the enclosure. The temperature profile 81 characterizes server temperature at low processor load assuming the lack of an airflow anomaly. The temperature profile 82 characterizes server temperature at the same low processor load, but with the addition of an airflow anomaly not accounted for in the temperature profile 81. A comparison of temperature profiles 81, 82 illustrates the negligible effects of an airflow anomaly at a low processor load. A temperature differential $dT_1$ between the two temperature profiles 81, 82 is negligible because the temperatures are not appreciably affected by an airflow anomaly while at the low processor load. The temperature differential $dT_1$ is small enough that to perform thermal diagnostics on the system at the lower processor load may not reliably detect the presence of an airflow anomaly.

Temperature profiles 83, 84 illustrate the more pronounced effects attributable to an airflow anomaly during higher processor load. The predicted temperature profile 83 has been generated assuming the lack of an airflow anomaly at the higher processor load. The temperature profile 84 graphs the actual temperatures at the same relatively high processor load of profile 83, with the addition of the same airflow anomaly reflected in the temperature profile 82. The higher processor load temperature profiles 83, 84 are both appreciably higher than the low processor load temperature profiles 81, 82 because operating servers at a higher load causes them to run hotter. The temperature profile 84 is appreciably higher than the temperature profile 83 because the higher temperatures caused by the increased processor load amplify the effects of the airflow anomaly. A temperature differential $dT_2$ between the two high processor load temperature profiles 83, 84 is substantially larger than the negligible temperature differential $dT_1$ between the two low processor load temperature profiles 81, 82 at locations throughout the system. This graph illustrates the more pronounced temperature effects of an airflow anomaly at higher processor load.

Because an airflow anomaly produces a more pronounced difference in the temperature at higher processor load, airflow anomalies are more detectable at higher processor load, as discussed in the context of the diagnostics system of FIG. 4. Several other factors also effect whether a diagnostics system may reliably discern the effects of an airflow anomaly. One such factor is the resolution or "noise budget" of temperature sensors used to sense actual temperatures in the system. For example, a temperature sensor having an error of +/−1° does not have sufficient resolution to support a conclusion that an actual temperature increase of only a few degrees is attributable to an airflow anomaly, even where the model predicts that a similar temperature increase could be attributable to an airflow anomaly. Another factor affecting the ability of the diagnostics system to detect airflow anomalies is the degree of error inherent to predicting temperatures using thermal diagnostics models. Thermal diagnostics results indicating a small temperature increase may be inconclusive as to whether the detected airflow anomaly is actually present in the system. Thermal diagnostics results predicting a larger temperature difference in the computerized model are typically a more reliable indicator of the presence of the airflow anomaly in the actual system. Other factors, such as uncertainties in modeling parameters (e.g., component airflow impedances, fan performance characteristics, power dissipation versus CPU utilization) and measurement uncertainties (e.g., fan speed, temperature readings), may contribute to errors in the actual or predicted temperatures used as variables in thermal diagnostics.

Figure 6:
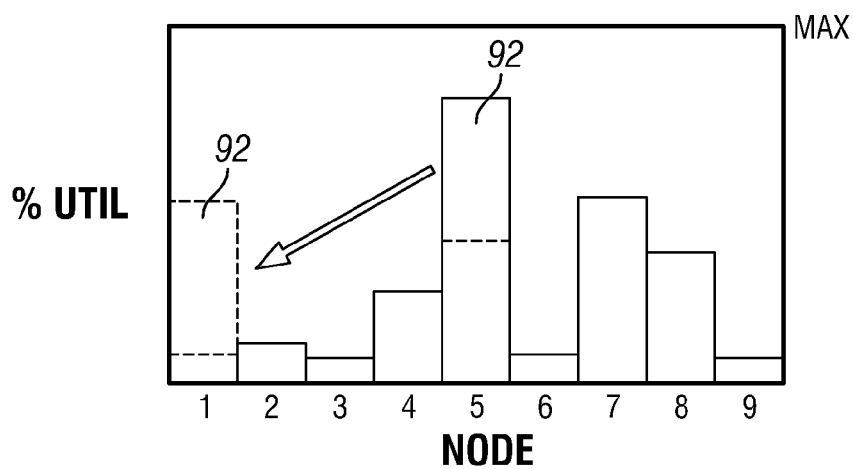
FIG. 6 is a chart illustrating the use of workload migration to shift processor load from one server to another in a hypothetical nine-server system.

Processor load may be increased in a variety of ways according to the invention. One way to increase processor load involves the use of workload migration to shift processor load from one node to another. FIG. 6 is a chart illustrating the use of workload migration to shift processor load from one server to another in a hypothetical nine-server system. The horizontal axis of the chart is numbered from 1 to 9, with each numeral designating one of nine servers in a rack enclosure. The vertical axis indicates "percent utilization, as a convenient measure of processor load on each of the servers. Each bar of the chart represents the processor load at a particular server. Servers 5, 7, and 8 are operating at a relatively high processor load, which is typically due to one or more processes running on the servers 5, 7, and 8. Servers 1, 3, and 6 are operating at a low processor load, which may occur if the servers 1, 3, and 6 are running fewer or less intense processes, or merely powered on and "idling."

Increasing the processor load on the servers 1, 3, and 6 to obtain higher steady-state temperatures will selectively amplify the effects of any airflow anomalies to be detected by thermal diagnostics. For example, a significant portion 92 of processor load is transferred from the server 5 to the server 1 by shifting some processes from the high load server 5 to the target server 1. This migration of processor load from the server 5 to the server 1 increases the processor load on the server 1, to amplify the effects of any airflow anomaly that may exist on the server 1. Sufficient load may remain on the server 5 in order to monitor and detect any airflow anomalies that may affect the server 5. Desirably, the net energy consumption and total processor utilization on the computer system may remain substantially the same because existing processes were simply shifted from the server 5 to the server 1.

Figure 7:
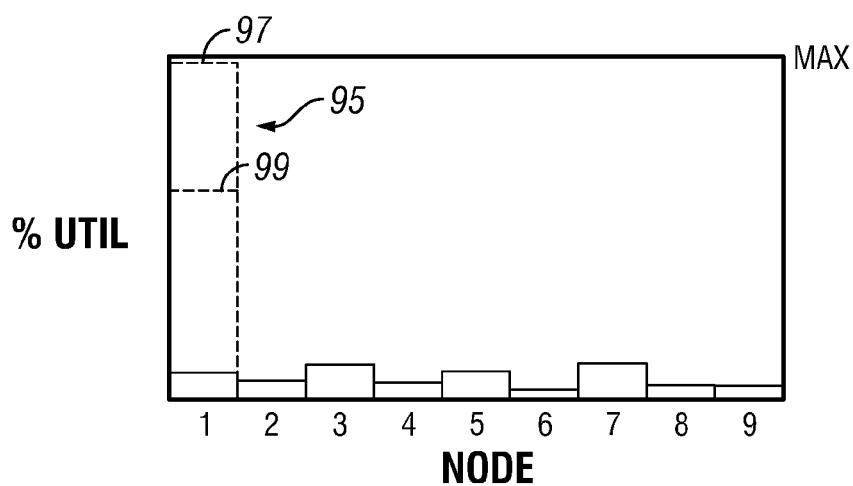
FIG. 7 is a chart illustrating the imposition of an artificial workload on the server, under different load conditions.

Another way to increase processor load is to impose an artificial load on a node of a computer system. An "artificial load" typically consists of one or more processes generated for the purpose of increasing processor load. Any computational results of an artificial load are generally not important, except for the generation of heat as a byproduct. Still, low priority processes that yield useful result can be run to increase processor load as needed. FIG. 7 is a chart illustrating the imposition of an artificial workload 95 on the server 1, under different processor load conditions. Prior to imposing the artificial workload, all of the servers 1-9 may initially be idling at relatively cool temperatures, which accounts for the lower processor load placed on each server. As a consequence, sufficient processor load is not available elsewhere in the system to shift processor load to the server 1. The artificial workload 95 is imposed on the server 1-9 to facilitate the detection of airflow anomalies affecting the server 1. The artificial load may be, for example, an infinite loop performed on the server 1. The artificial load facilitates the detection of any airflow anomalies that may affect the server 1 by increasing the temperature of the server 1. An artificial load may be placed on any particular server operating at a low load regardless of whether or not the other servers have sufficient load to enable load migration. The artificial load can then be removed from the server once the analysis has been completed, and optionally moved to another server if needed. When necessary, multiple instances of artificial workload may be applied to multiple servers at the same time, to improve the speed of performing the thermal diagnosis of an entire system.

The invention also includes a variety of ways for determining how much to increase processor load to facilitate thermal diagnostics. According to one approach, processor load may be automatically increased to a predetermined level. For example, the processor load on the server 1 may be automatically increased to about 100% (full processor utilization), as indicated at 97. Executing an infinite loop on the server 1 is one way to potentially increase the processor load on the server 1 to about 100%. Running the server 1 at full processor utilization will typically increase temperature faster. Running the server 1 at full processor utilization will also typically produce the hottest temperatures, thus maximizing the effects of an airflow anomaly. However, running the server 1 at maximum capacity may also pose an increased risk of overheating during diagnostics.

To reduce any risk of potential overheating, the processor load on the server 1 may alternatively be increased to a predetermined amount that is less than full processor utilization, but still large enough to facilitate the reliable detection of any airflow anomalies. For example, the processor load on the server 1 may be increased to about 60% processor utilization, as indicated at 99. Typically, imposing at least 40% processor utilization on a node and allowing steady state temperatures to be reached will be sufficient for the detection of thermal anomalies that may affect the node. Imposing a processor load of less than 100% may also provide energy savings as compared with running a node at full processor utilization.

Another approach is to estimate the minimum processor load required to produce a measurable temperature difference attributed to the presence of the airflow anomaly. Such an approach may be selected for the purpose of optimizing the energy efficiency and performance of a computer system, by not increasing processor load more than necessary to reliably detect any airflow anomalies. For example, to test for a selected airflow anomaly, the system may be modeled both with and without the selected airflow anomaly for various processor loads. If the predicted temperature increase attributed to the airflow anomaly is not substantially larger than the resolution of the temperature sensors in the computer system, the processor load in the model may be increased to a level at which the predicted temperature difference attributable to the airflow anomaly exceeds the resolution of the temperature sensors. Alternatively, the minimum processor load could be estimated on the basis of Gaussian noise models. For example, the processor load input to the model may be increased in response to the predicted temperature difference being less than two standard deviations of a noise budget. The processor load may then be increased until a steady state temperature is reached at which the predicted temperature difference is at least two standard deviations of the noise budget. In yet another example, the analog temperature sensor may be fed into an 8-bit analog to digital converter, with a resolution of one part in 256, and therefore require that the temperature difference be greater than $\frac{1}{256}$th of the range of the temperature sensor. Other objective standards for deciding whether and how much to increase the actual processor load on a given node are within the scope of the invention.

Figure 8:
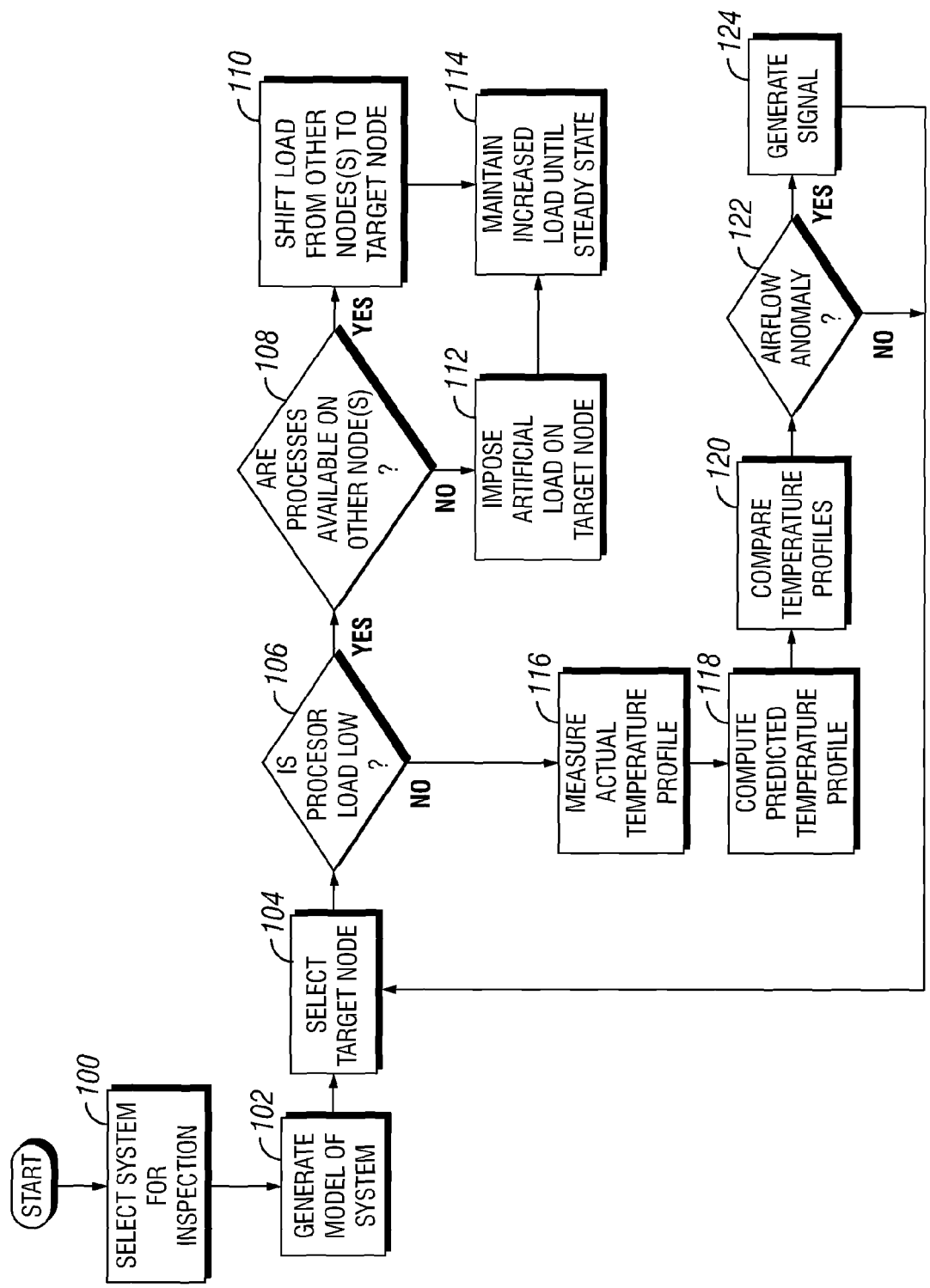
FIG. 8 is a flowchart generally outlining one embodiment of a method of performing thermal diagnostics on a computer system according to the invention.

FIG. 8 is a flowchart generally outlining one embodiment of a method of performing thermal diagnostics on a computer system according to the invention. The flowchart provides an overview of the embodiment, and reflects many of the considerations discussed with respect to the other figures, but is not intended to provide an exhaustive list of all steps and variations that could be performed according to the invention. In step 100, a system is selected for inspection, namely for the performance of thermal diagnostics. The system here is a multi-node computer system, although the invention may be implemented on a computer system having as few as a single node. In step 102, a thermal model of the system is generated according to thermal diagnostics techniques, such as Flow Network Modeling. The thermal model may take into account the topology of the system, including the individual heat and airflow properties of components and configurations of the system. The thermal model inter-relates the various system components, and may receive and account for input from a number of sensors, including temperature sensors positioned at known locations throughout the system. In step 104, one or more target nodes are selected. The target node(s) are elements of the system upon which an airflow anomaly could have an adverse effect. For example, the target node may be a server, and a blocked intake vent beneath the server is one potential cause of an airflow anomaly that could make the selected server overheat at higher processor load.

Conditional step 106 determines whether processor load is too low for the reliable detection of airflow anomalies. Processor load may be "low" if it is insufficient for the detection of airflow anomalies. If processor load is low, then conditional step 108 determines whether there is sufficient load on another node to enable shifting workload to the target node. If sufficient load is available on another node, load may be shifted in the form of one or more processes to the target node in step 110. If sufficient load is not available on another node, then an artificial load may instead be generated and imposed on the target node in step 112. In step 114, the increased load on the target node—whether from workload migration in step 110, artificial load generated in step 112, or both—is maintained until the temperature reaches a substantially steady-state value.

With the processor load increased, thermal diagnostics can be more reliably performed according to a variety of techniques such as Flow Network Modeling. Steps 116 through 124 outline, by way of example and not by limitation, one approach for detecting thermal anomalies at the higher processor load. In step 116, an actual temperature profile is measured. The actual temperature profile may include one or more temperatures in the system. In step 118, a predicted temperature profile is computed from the model. The predicted temperature profile may contain one or more temperature values. The actual and predicted temperature values may both be mapped to the system for comparison in step 120. If an airflow anomaly is detected in conditional step 122, then a signal is generated in step 124. The signal may alert a user that an airflow anomaly potentially exists in the system, along with any details about the airflow anomaly.

It should be recognized that the invention may take the form of an embodiment including software elements. Non-limiting examples of software include firmware, resident software, and microcode. More generally, the invention can take the form of a computer program product accessible from a computer-readable medium providing program code for use by or in connection with a computer or any instruction execution system. For the purposes of this description, a computer-usable or computer readable medium can be any apparatus that can contain, store, communicate, propagate or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), and DVD.

A data processing system suitable for storing and/or executing program code typically includes at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution.

Input/output (I/O) devices such as keyboards, displays, or pointing devices can be coupled to the system, either directly or through intervening I/O controllers. Network adapters may also be used to allow the data processing system to couple to other data processing systems or remote printers or storage devices, such as through intervening private or public networks. Modems, cable modems, Ethernet cards, and wireless network adapters are examples of network adapters.

Figure 9:
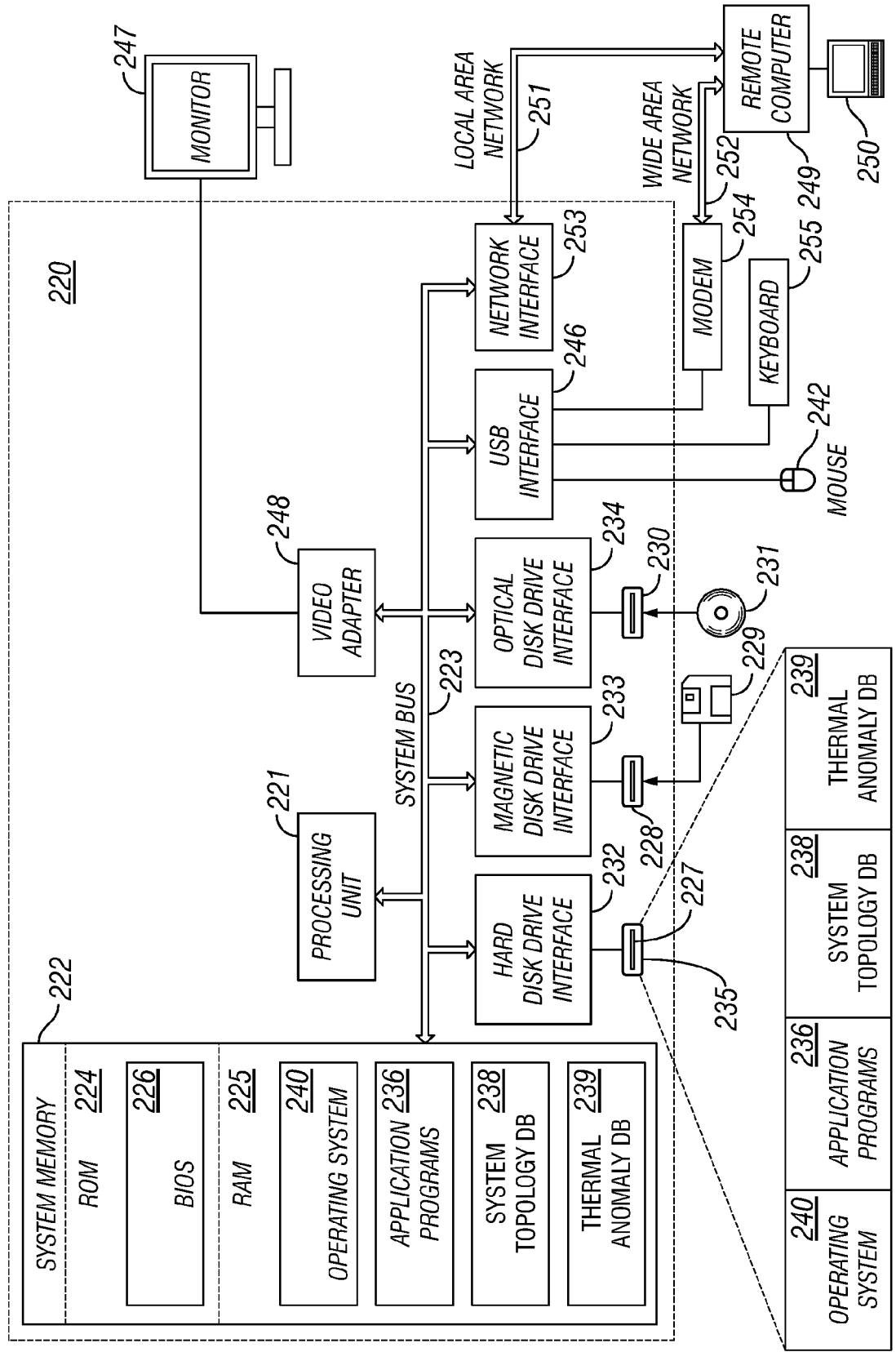
FIG. 9 is a schematic diagram of the computer that may be configured for thermally modeling a computer system and detecting airflow anomalies in the computer system.

To illustrate, FIG. 9 is a schematic diagram of the computer 220 that may be configured for thermally modeling a computer system and detecting airflow anomalies in the computer system. The computer 220 may be a server or subsystem included with the computer system being thermally diagnosed. Generally, computer system 220 includes a processing unit 221, a system memory 222, and a system bus 223 that couples various system components, including the system memory 222 to processing unit 221. System bus 223 may be any of several types of bus structures including a memory bus or memory controller, a peripheral bus, and a local bus using any of a variety of bus architectures. The system memory includes a read only memory (ROM) 224 and random access memory (RAM) 225. A basic input/output system (BIOS) 226 is stored in ROM 224, containing the basic routines that help to transfer information between elements within computer system 220, such as during start-up.

Computer system 220 further includes a hard disk drive 235 for reading from and writing to a hard disk 227, a magnetic disk drive 228 for reading from or writing to a removable magnetic disk 229, and an optical disk drive 230 for reading from or writing to a removable optical disk 231 such as a CD-R, CD-RW, DV-R, or DV-RW. Hard disk drive 235, magnetic disk drive 228, and optical disk drive 230 are connected to system bus 223 by a hard disk drive interface 232, a magnetic disk drive interface 233, and an optical disk drive interface 234, respectively. Although the exemplary environment described herein employs hard disk 227, removable magnetic disk 229, and removable optical disk 231, it should be appreciated by those skilled in the art that other types of computer readable media which can store data that is accessible by a computer, such as magnetic cassettes, flash memory cards, digital video disks, Bernoulli cartridges, RAMs, ROMs, USB Drives, and the like, may also be used in the exemplary operating environment. The drives and their associated computer readable media provide nonvolatile storage of computer-executable instructions, data structures, program modules, and other data for the computer system 220. For example, the operating system 240 and application programs 236 may be stored in the RAM 225 and/or hard disk 227 of the computer system 220.

A user may enter commands and information into computer system 220 through input devices, such as a keyboard 255 and a mouse 242. Other input devices (not shown) may include a microphone, joystick, game pad, touch pad, satellite dish, scanner, or the like. These and other input devices are often connected to processing unit 222 through a USB (universal serial bus) 246 that is coupled to the system bus 223, but may be connected by other interfaces, such as a serial port interface, a parallel port, game port, or the like. A display device 247 may also be connected to system bus 223 via an interface, such as a video adapter 248. In addition to the monitor, personal computers typically include other peripheral output devices (not shown), such as speakers and printers.

The computer system 220 may operate in a networked environment using logical connections to one or more remote computers 249. Remote computer 249 may be another personal computer, a server, a client, a router, a network PC, a peer device, a mainframe, a personal digital assistant, an internet-connected mobile telephone or other common network node. While a remote computer 249 typically includes many or all of the elements described above relative to the computer system 220, only a memory storage device 250 has been illustrated in FIG. 9. The logical connections depicted in the figure include a local area network (LAN) 251 and a wide area network (WAN) 252. Such networking environments are commonplace in offices, enterprise-wide computer networks, intranets, and the internet.

When used in a LAN networking environment, the computer system 220 is often connected to the local area network 251 through a network interface or adapter 253. When used in a WAN networking environment, the computer system 220 typically includes a modem 254 or other means for establishing high-speed communications over WAN 252, such as the internet Modem 254, which may be internal or external, is connected to system bus 223 via USB interface 246. In a networked environment, program modules depicted relative to computer system 220, or portions thereof, may be stored in the remote memory storage device 250. It will be appreciated that the network connections shown are exemplary and other means of establishing a communications link between the computers may be used.

Program modules may be stored on hard disk 227, optical disk 231, ROM 224, RAM 225, or even magnetic disk 229. The program modules may include portions of an operating system 240, application programs 236, or the like. A system topology database 238 contains parameters of the computer system to be thermally modeled. A thermal anomaly database 239 may also be included, containing information relating to a plurality of hypothetical thermal anomalies that may occur within the computer system 220. In one example of use, the computer system 220 may model scenarios from the thermal anomaly database 239 and compare them to actual temperature data to determine which, if any, of the scenarios closely match the actual temperature data.

Aspects of the present invention may be implemented in the form of application program 236. Application program 236 may be informed by or otherwise associated with the system topology database 238 and/or the thermal anomaly database 239. The application program 236 generally comprises computer-executable instructions for performing thermal diagnostics and, in particular, for selectively increasing processor load and detecting thermal anomalies according to the invention.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium encoded with a computer program product including computer usable program code for thermally modeling heating and airflow patterns in a computer system, the computer program product comprising:

computer usable program code for performing operations on one or more nodes of a computer system;

computer usable program code for selectively increasing a processor load at a selected node to a level sufficient that an airflow anomaly would cause a detectable temperature difference at the selected node;

computer usable program code for receiving a signal representative of an actual temperature at the selected node while at the increased processor load;

computer usable program code for predicting a temperature at the selected node by thermally modeling the computer system at the increased processor load; and computer usable program code for computing a difference between the predicted temperature and the detected temperature to detect the presence of the airflow anomaly.

2. The non-transitory computer readable medium of claim 1, wherein selectively increasing the processor load at the selected node comprises shifting one or more processes running on another node to the selected node.

3. The non-transitory computer readable medium of claim 1, wherein increasing the processor load of the selected node comprises imposing an artificial load on the selected node.

4. The non-transitory computer readable medium of claim 1, wherein increasing the processor load of the selected node comprises shifting one or more processes running on another node to the selected node.

5. The non-transitory computer readable medium of claim 3, wherein the additional load is selected from the group consisting of an infinite loop, a CPU-intensive internal diagnostics workload, and a CPU-memory bus-intensive workload having a set of continuous reads and writes to memory.

6. The non-transitory computer readable medium of claim 1, wherein the level to which the processor load is increased is a predetermined percentage of full processor utilization.

\* \* \* \* \*